(12) United States Patent
Takahashi et al.

(10) Patent No.: US 6,398,365 B1
(45) Date of Patent: Jun. 4, 2002

(54) IMAGE PROJECTION DISPLAY APPARATUS

(75) Inventors: Ryusaku Takahashi; Shintaro Nakagaki; Tsutou Asakura; Fujiko Koyama, all of Kanagawa-ken (JP)

(73) Assignee: Victor Company of Japan, Limited, Kanagawa-ken (JP)

( * ) Notice: Subject to any disclaimer, the term of this patent is extended or adjusted under 35 U.S.C. 154(b) by 0 days.

(21) Appl. No.: 09/520,948

(22) Filed: Mar. 8, 2000

(30) Foreign Application Priority Data

Mar. 12, 1999 (JP) .......................................... 11-067524

(51) Int. Cl.[7] ...................... G03B 21/00; G03B 21/26; G03B 21/28; G02F 1/1335; G02B 27/14
(52) U.S. Cl. ........................ 353/31; 353/34; 353/37; 349/5; 349/7; 349/8; 359/634
(58) Field of Search ........................... 353/31, 33, 34, 353/37; 349/5, 7, 8, 9; 359/634

(56) References Cited

U.S. PATENT DOCUMENTS

| | | | | |
|---|---|---|---|---|
| 3,987,299 A | * | 10/1976 | Mulder .................. | 250/214 VT |
| 5,884,991 A | * | 3/1999 | Levis et al. ............... | 353/122 |
| 6,095,654 A | * | 8/2000 | Hatanaka et al. ........... | 353/37 |
| 6,219,111 B1 | * | 4/2001 | Fukuda et al. ............. | 349/5 |
| 6,273,568 B1 | * | 8/2001 | Okuyama .................. | 353/31 |

FOREIGN PATENT DOCUMENTS

| | | |
|---|---|---|
| JP | 460538 | 2/1992 |
| JP | 09043562 | 2/1997 |
| JP | 09189809 | 7/1997 |
| JP | 11160711 | 6/1999 |

* cited by examiner

*Primary Examiner*—Christopher Mahoney
*Assistant Examiner*—Magda Cruz
(74) *Attorney, Agent, or Firm*—Nath & Associates PLLC; Gary M. Nath; Marvin C. Berkowitz

(57) ABSTRACT

A projection display apparatus (100) is formed by a light source (4) radiating white light w, a collimator lens (5) that converts condensed light flux from the light source (4) to collimated light flux, a cold mirror (6) for eliminating unwanted infrared light included in the white light w, an integrator that makes the intensity distribution of the illumination light on an object to be illuminated uniform, a reflective mirror (8) that reflects light flux from the integrator (7) at a prescribed angle, a polarizer (9) that polarizes separated light of each wavelength band, a spatial light modulation section (10), a coupling prism (11), and a projection lens (12).

5 Claims, 10 Drawing Sheets

POSITION ON THE SURFACE
OF THE OBJECT BEING ILLUMINATED
IN THE X OR Y AXES

IMAGE PROJECTION DISPLAY APPARATUS

BACKGROUND OF THE INVENTION

1. Field of the Invention

The present invention relates to an image projection display apparatus in which, from a luminance flux formed as a conglomerate of light of a plurality of wavelength bands, light of mutually different colors are separated out, each chromatic light being modulated so as to project an image onto a large screen.

2. Description of the Related Art

A projection-type image display apparatus has been developed in the past for displaying an image on a large screen, for use in outdoor displays in public places, or administrative displays, or in providing a display for high-resolution images.

Such projection-type display apparatuses can be generally classified as either transmission-type or reflection-type display apparatuses. In either case, light comprised of a conglomerate of a plurality of light wavelength bands is separated into light of mutually different wavelength bands and caused to illuminate an LCD (liquid-crystal display) panel, this incident light being modulated in pixel units according to a picture signal, so as to provide spatial modulation of the projected light.

There is a known LCD panel that makes use of three pixel electrodes corresponding to three primary colors as a unit, these being arranged in a matrix of liquid-crystal display elements in a single LCD panel, in what is known as a single-LCD projection display apparatus. A widely known single-LCD color projection display apparatus uses color-absorbing filters for the three primary colors red, green, and blue, disposed over the surface of pixel electrodes corresponding to these colors.

In an absorption-type color filter, however, although a particular wavelength is efficiently passed, light of other wavelengths is absorbed so that it is not passed. For this reason, in this type of display, there is the problem that light that passes through the color filter and reaches the pixel electrodes is reduced to ⅓ of the intensity of light (white light) that is incident to the absorption-type color filter.

A single-LCD color projection display apparatus to solve this problem was disclosed, for example, in Japanese Patent Application Laid-open Publication H4-60538. FIG. 1 is a plan view of a color projection display apparatus of the prior art, and FIG. 2 is a schematic representation of a liquid-crystal display device used therein.

In FIG. 1, white light w radiating from a light source 4 enters a collimator lens 5, and is converted to collimated light flux by the collimator lens 5. The collimated light flux is divided into light of three wavelength bands by a color separator 50.

The color separator 50 is made up of an R dichroic mirror 50R that selectively reflects only light r in the wavelength band of red light, and passes light of a different wavelength band, a G dichroic mirror 50G that selectively reflects only light g in the wavelength band of green light, and passes light of a different wavelength band, and a B dichroic mirror 50B that selectively reflects only light b in the wavelength band of blue light, and passes light of a different wavelength band. The dichroic mirrors 50R, 50G, and 50B are disposed at mutually different angles with respect to the axis of the collimated light flux.

That is, whereas the G dichroic mirror 50G is disposed at an angle of 45° with respect to the optical axis, the R dichroic mirror 50R closer to the light source is disposed at an angle that is smaller than 45°, and the B dichroic mirror 50B is disposed at an angle that is greater than 45°. By means of these orientations, the red, green, and blue light beams each exit from the color separator 50 at different angles. For example, the red light r illuminates a micro-lens array 122 at an angle of incidence of +α°, the green light g illuminates a micro lens array 122 at an incidence angle of 0°, and the blue light illuminates the micro-lens array 122 at the incident angle −α°.

The color projection display apparatus has a liquid-crystal display 51. This liquid-crystal display 51, as shown in FIG. 2, has a microlens array 122 on a light entering side of the liquid crystal display element 123.

A liquid-crystal display element 123 is made up of glass substrates 125 and 129, between which are provided a signal electrode 126, a liquid-crystal layer 127, and a transparent electrode 128. The signal electrode 126 is made up of signal electrodes 126R, 126G, and 126B corresponding to the colors red, green, and blue, arranged in a stripe on the glass substrate 125 m above-described and the liquid-crystal layer 127 is provided on top of the signal electrodes. The transparent electrode 128 is provided between the liquid-crystal layer 127 and the glass substrate 129. It should be noted the alignment layer is not shown in FIG. 2.

The micro-lens array 122 is adhered to the upper surface of the glass substrate 129, and is formed by disposing in parallel vertical stripe lenticular lenses 122e each having a width that is the same as one group formed by a signal electrodes 126R, 126G, and 126B and corresponding to these colors of light.

The output light from a liquid-crystal display 51 like this is condensed by a condenser lens 54, and projected via a projection lens 52 in enlarged form as a color image on a screen 53.

In the above-noted image projection display apparatus of the prior art, because there is a requirement for high accuracy in the assembly angles of the dichroic mirrors 50R, 50G, and 50B, it is necessary to perform fine adjustment of the assembly angle at the time of assembly. FIG. 3 illustrates a method of adjusting the assembly angles of the dichroic mirrors 50R, 50G,and 50B. This drawing shows the case of adjusting the angle of incidence of the blue light b.

As shown in FIG. 3, of the light that enters the B dichroic mirror 50B, only blue light b is selectively reflected, so that it enters the micro-lens array 122 at point P at an incident angle of −α1. One method that can be envisioned of changing the angle of incidence is to rotate the B dichroic mirror 50B by Δθ about the center point O, so as to reposition it at an angle shown by 50B'. By doing this, the angle of incidence with respect to the micro-lens array 122 is corrected from −α1 to −α2.

With the above-noted method, however, although it is possible to correct the angle of incidence, there is an accompanying shift in the center position of incidence from point P to point P'. If this kind of shift in center incidence position occurs and there is not a margin that will allow a shift in the illuminated light flux approximately the same as the surface area of the micro-lens array 122, there will occur a part of the light that will not enter the micro-lens array 122, to the extent of the shift that occurs, this causing the problem of a yellow line from which blue is absent at the edge of the projection screen 53, thereby causing a deterioration in the image quality. This occurs not just for blue light, but for red light as well.

A method that can be envisioned to prevent the occurrence of a shift in the position of incidence of light is to make the illuminated light flux diameter larger. If this is done, however, the efficiency of light usage worsens, and it is not possible to achieve a projection apparatus with high brightness.

With respect to the above problems, there is a method that is envisioned for preventing the occurrence of a shift in the center position of light incidence while adjusting the assembly angles of the dichroic mirrors 50R, 50G, and 50B. FIG. 4 shows a method of adjusting the angle of incidence of the illuminated light flux without changing the center position of incidence of the illuminated light flux.

In this method, after first translating the B dichroic mirror 50B rearward along the axis of incidence, the mirror is rotated by an angle of $\Delta\theta$ about the center O of the dichroic mirror 50B. By doing this, it is possible to change the angle of incidence from $-\alpha 1°$ to $-\alpha 2°$ without changing the incidence position with respect to the micro-lens array 122.

However, in the above-noted method, in which the dichroic mirrors 50R, 50G, and 50B are rotated after translating them, it is necessary to have two mechanisms, one for translating the dichroic mirrors 50R, 50G, and 50B, and one for rotating the dichroic mirrors 50R, 50G, and 50B, thereby not only complicating the mechanism of the apparatus and increasing its cost, but also increasing the number of adjustment steps, thereby increasing the overall cost of manufacturing the image projection display apparatus.

SUMMARY OF THE INVENTION

Accordingly, it is an object of the present invention to provide an image projection display apparatus that enables adjustment of the three separated colors of light that are emitted, with a simple adjustment mechanism.

A first aspect of the present invention that solves the problems noted above in the related art is an image projection display apparatus in which, from light flux made up of a conglomeration of chromatic light of a plurality of wavelength bands, chromatic light having mutually different wavelength bands are separated, each of these chromatic light being modulated to project and display an image. This image projection display apparatus has a color-separation element formed by a plurality of wavelength-selective reflective mirrors that each selectively reflect light of a prescribed wavelength and pass light of a color having a different wavelength, these mirrors being arranged at a prescribed interval, and being oriented at a prescribed angle with respect to the optical axis of the light flux, a condensing element that condenses each of the chromatic light separated by the color-separating element, and an adjusting means for adjusting the spacing of each type of wavelength-selective reflective mirrors so as to changing the position of incidence of each separated chromatic light on the condensing element, thereby varying the angle of incidence of each of the colors of light exited from the condensing element, According to the present invention as noted above, light flux containing a plurality of chromatic light is separated into separate chromatic light of different wavelength bands by a variety of wavelength-selective reflective mirrors. These separated colors of light are shifted in parallel from a main optical axis in accordance with the spacing of the wavelength-selective reflective mirrors, so that the various chromatic light are refracted by the condensing element in accordance with the amount of shift thereof. Therefore, the various chromatic light exited from the condensing element have an incident angle responsive to the amount of shift of each chromatic light with respect to the object being illuminated, and there is no change in the position of incidence thereof on the object being illuminated.

By causing the spacing between the various wavelength-selective reflective mirrors to change, it is possible to change the exit angle without causing a change in the position of incidence of the light exiting the condensing element with respect to the object being illuminated.

A second aspect of the present invention is an image projection display apparatus in which white light including three primary colors is separated into these colors, which are modulated to perform display and projection of an image. This image projection display apparatus has a color-separation element minimally having three V-shaped mirrors, a first V-shaped mirror, a second V-shaped mirror, and a third V-shaped mirror, made of a first wavelength-selective reflective mirror that, of the white light, reflects light of a first color and passes light of the second and third colors, and a second wavelength-selective reflective mirror, provided behind the first wavelength-selective reflective mirror, that selectively reflects light of a third color and passes light of the first and the second colors, these mirrors being joined at prescribed angle and sequentially arranged in a lamination direction, a condensing element that condenses light of the first color, the second color, and the third color separated by the color-separation element. In this image projection display apparatus, the white light is caused to enter the first wavelength-selective reflective mirror of the second V-shaped mirror, at which light of the first color is reflected and light of the second and third colors are passed. Then, after causing light of the first color to be reflected by the first wavelength-selective reflective mirror of the first V-shaped mirror, it is passed through the second wavelength-selective reflective mirror of the first V-shaped mirror, this light of the first color being exited from the first V-shaped mirror. Of the second and third color light passing through the first wavelength-selective reflective mirror of the second V-shaped mirror, the third color light is caused to be reflected by the second wavelength-selective reflective mirror of the second V-shaped mirror, the second color light is passed and the second color light exits from the second V-shaped mirror, third color light reflected by the second wavelength-selective reflective mirror of the second V-shaped mirror being caused to be reflected by the second wavelength-selective reflective mirror of the third V-shaped mirror, an the third color light exiting from the third V-shaped mirror.

In the above, the names first, second, and third are applied as a convenience in identifying the mutual positional relationship therebetween and, if there are three V-shaped mirrors, the center mirror is taken as the second V-shaped mirror, with the mirrors positioned to either side thereof being the first or the third V-shaped mirror. If there are four or more V-shaped mirrors, by selecting any mirror as the second V-shaped mirror, the names of the mirrors change. That is, in the case in which there are four or more mirrors, any mirror other than the mirrors at both ends is selected as the second V-shaped mirror, and the mirrors to either side thereof are taken as the first or the third V-shaped mirror.

According to the above-described second aspect of the present invention, white light containing a plurality of chromatic light enters a central second V-shaped mirror, the result being that the white light is separated into chromatic light of different wavelength bands by the second V-shaped mirror and the first and third V-shaped mirrors disposed to either side thereof.

Because the separated light of each color is shifted in parallel from the main optical axis by a distance responsive to the spacing between the V-shaped mirrors, the light beams of each color are refracted by the condensing element by an angle amount that is responsive to the amount of shift thereof. Therefore, each color light exiting the condensing element has an angle of incidence responsive to the amount of shift thereof with respect to the object to be illuminated, and there is no change in the position of incidence at the surface of the object being illuminated.

A third aspect of the present invention is a variation of the second aspect of the present invention, wherein the spacing between the plurality of V-shaped mirrors is adjusted in the lamination direction, so that the positions of incidence of the first color light, the second color light, and the third color light separated by the color-separation element are changed, thereby enabling a change in the angle of exit of each color from the condensing element.

According to the above-noted third aspect of the present invention, by changing the spacing between the various types of V-shaped mirrors in the lamination direction, it is possible to change the angle of exit without changing the position of incidence with respect to the object being illuminated.

A fourth aspect of the present invention is a variation on the first aspect of the present invention, wherein, of the wavelength-selective reflective mirrors, one wavelength-selective reflective mirror has a dimension that is smaller than the others.

According to the above-noted fourth aspect of the present invention, by reducing the amount of reflection of one of the colors of light, it is possible to adjust the color balance or contrast. In particular when separating colors using a color-separation element, because there is a tendency for the intensity of light of a color that is not shifted from the optical axis of the illuminating light to be larger than light of the other shifted colors, this arrangement enables the reduction of the amount of reflection of that color, thereby enabling adjustment of balance with respect to the other colors.

A fifth aspect of the present invention is an image projection display apparatus in which a light modulation section is illuminated by light flux radiated from a light source, and is thereby modulated, so as to project an image. This display apparatus has an integrator that has a large number of small-diameter lenses which convert the light flux from the light source to a large number of light fluxes, a first image optical system for overlapping this large number of light fluxes at a first image plane, and a second image optical system for forming the image formed at the first image plane as at a second image plane, wherein a virtual image plane with respect to the color-separation element of the first image plane, a principal plane of the second image optical system, and the light modulation section are disposed so as to intersect at a substantially straight lines that are extension lines thereof.

According to the fifth aspect of the present invention, by converting a light flux from a light source into a large number of light fluxes, grouping these first at a first image plane using a first image optical system, and then forming an image at an illuminated plane of the light modulator section, which is the second image plane, it is possible to illuminate the light modulation section with a uniform illumination. When this is done, the second image optical system and the light modulation section receiving plane, which is the second image plane form a perspective optical system, it is possible to prevent the occurrence of defocusing in the region of the edge of the illuminated light flux.

DETAILED DESCRIPTION OF THE PREFERRED EMBODIMENTS

First Embodiment

Figure 1:
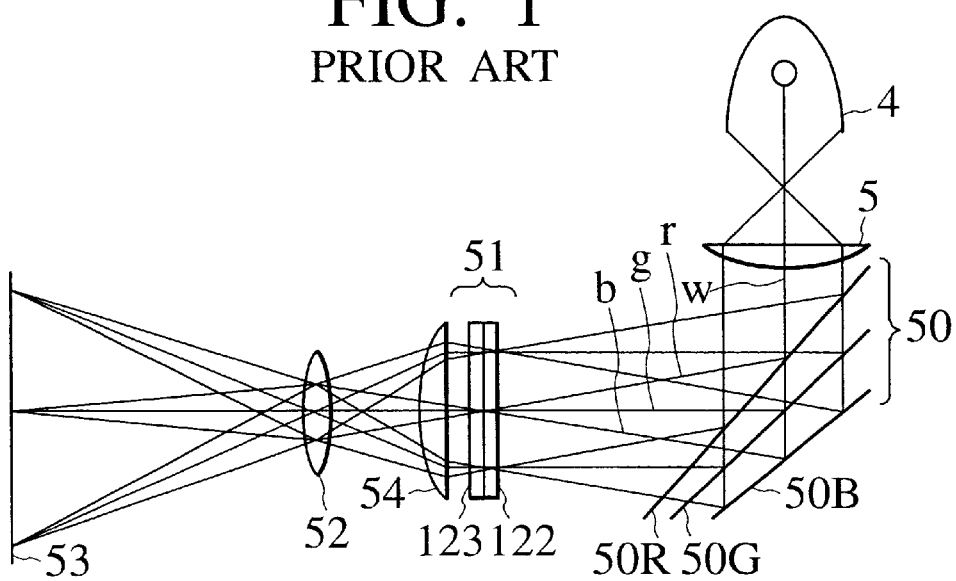
FIG. 1 is a drawing showing the general configuration of a projection display apparatus of the prior art.
Figure 2:
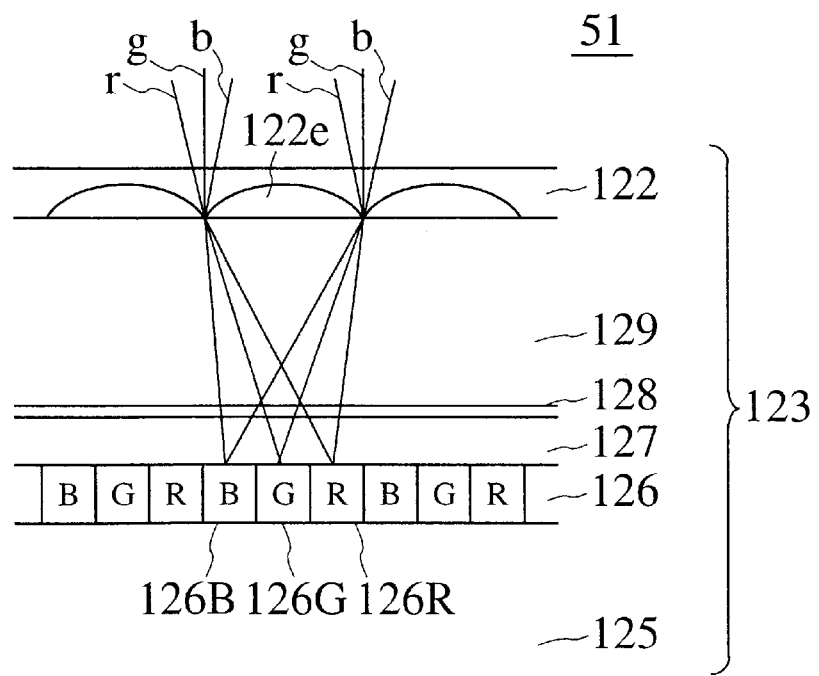
FIG. 2 is a drawing illustrating the configuration of a spatial modulation section of the prior art.
Figure 3:
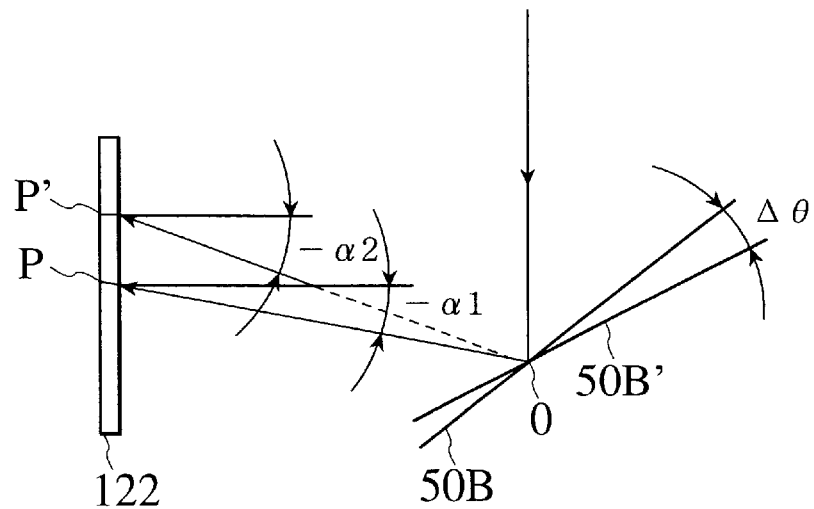
FIG. 3 is a drawing showing a method of changing the angle of incidence according to a color-separation element of the prior art.
Figure 4:
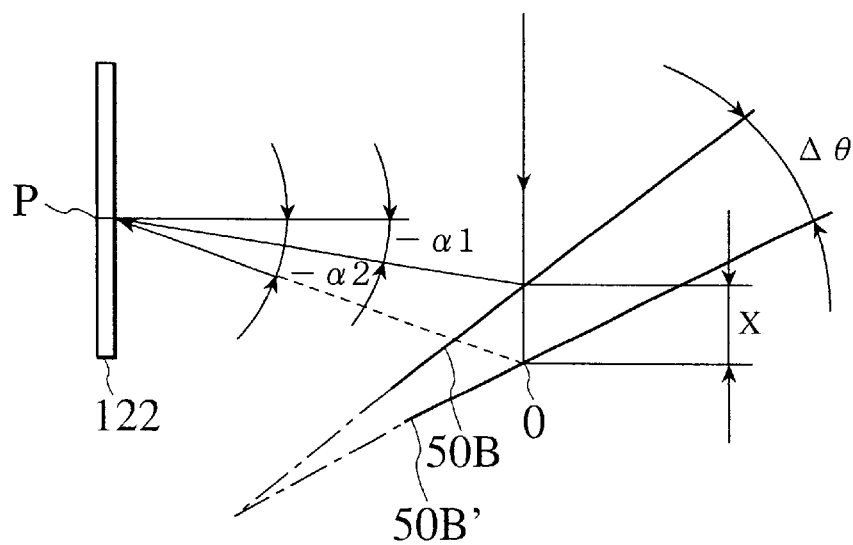
FIG. 4 is a drawing illustrating another method of changing the angle of incidence according to a color-separation element of the prior art.
Figure 5:
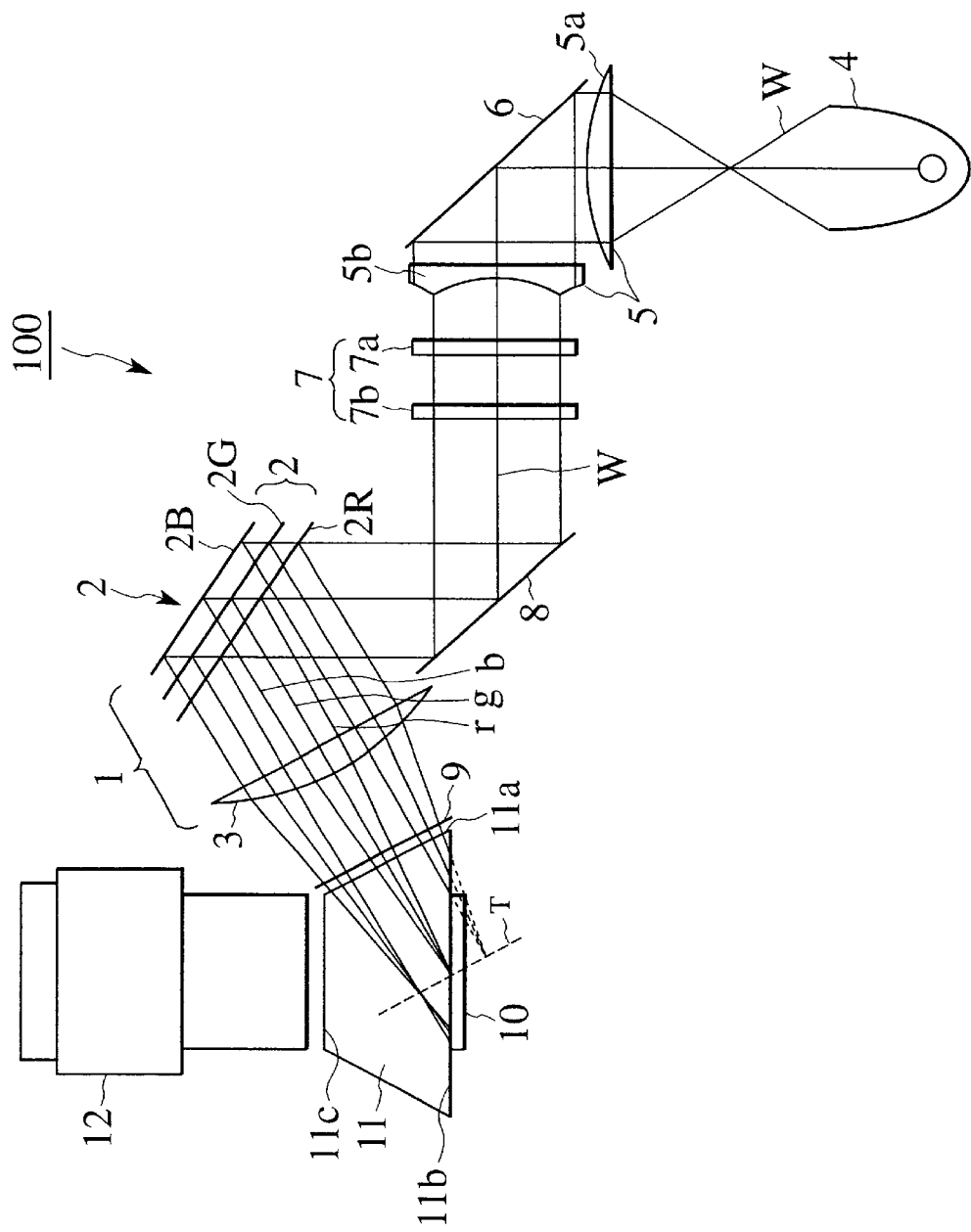
FIG. 5 is a drawing showing the general configuration of a projection display apparatus according to the first embodiment of the present invention.

The first embodiment of the present invention is described below in detail. FIG. 5 illustrates a projection display apparatus 100 according to this embodiment.

Configuration of the Projection Display Apparatus 100

As shown in FIG. 5, the projection display apparatus 100 generally has a light source 4 radiating a white light w, a collimator lens 5 that converts the condensed light flux from the light source 4 to collimated light flux, a cold mirror 6 for eliminating unwanted infrared light included in the white light w, an integrator 7 for making the intensity distribution of the illumination light at the object being illuminated uniform, a reflective mirror 8 for reflecting light flux from the integrator 7 at a prescribed angle, a color-separation section 1 for dividing the light flux into chromatic light in each wavelength band, a polarizer 9 for polarizing each of the separated light beams of various wavelength bands, a spatial light modulation section 10, a coupling prism 11, and a projection lens 12.

The collimator lens 5 is formed by the combination of a convex lens 5a and a concave lens 5b, and converts the white light w from the light source 4 to collimated light flux. In this embodiment, the cold mirror 6 is disposed between the convex lens 5a and the concave lens 5b.

The integrator 7 is formed by a first and second integrators 7a and 7b, and makes the illumination light of the light source 4 into distribution.

Specifically, the integrator 7 is formed by a first integrator 7a in which a plurality of small-diameter lens segments are arranged in an array, and a second integrator 7b having a plurality of lens segments for forming images from each of the lens segments of the first integrator 7a. Each lens segment of the first and second integrators 7a and 7b are in mutually opposition.

The polarizer 9 has a transmission axis set so as to transmit linearly polarized light that is the S polarized light component with respect to a hologram color filter, to be described later.

Figure 6:
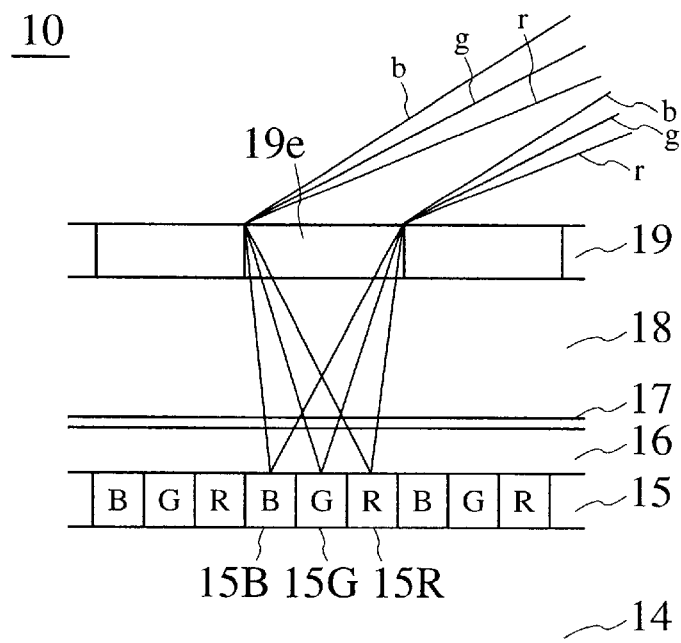
FIG. 6 is a drawing illustrating the configuration of a spatial light modulator section according to the first embodiment of the present invention.

The spatial light modulation section 10, as shown in FIG. 6, is a so-called reflection type, wherein, onto a silicon substrate 14, a pixel electrode layer 15, in which pixel electrodes 15R, 15G, and 15B are formed as stripes, a liquid-crystal layer 16, a transparent electrode 17, a thin glass sheet 18, and a hologram filter 19 are sequentially laminated. The hologram filter 19 has vertical stripe hologram lenses 19, arranged in parallel, each one corresponding to the width of a group of pixel electrodes 15R, 15G, and 15B, for the three primary colors.

The coupling prism 11 is made from a flat sheet of glass, one surface 11a of which is formed so as to be substantially perpendicular to the light rays of each of the wavelength bands separated by the color-separation element 1. The bottom surface 11b of the coupling prism 11 has the spatial light modulation section 10 mounted to it, a light flux that is modulated and reflected by the spatial light modulation section 10 passing through the upper surface 11c and entering the projection lens 12.

Operation of the Projection Display Apparatus 100

With a projection display apparatus configured as described above, white light w that is radiated from the light source 4 is converted to collimated light flux by the collimator lens 5, and passes through the integrator 7 and reflective mirror 8, so as to enter the color-separation element 1. Then, the light rays r, g, and b of the various wavelength bands separated by the color-separation element 1 are polarized at the polarizer 9 at each prescribed angle of incidence, after which they enter the coupling prism 11, and finally reach the spatial light modulation section 10.

At the spatial light modulation section 10, the hologram lens array 19 diffracts the three primary colors of incident light, condensing them onto the pixel electrode of the corresponding color. For example, in this embodiment, the design is such that the main optical axis of green light with an angle of incidence of 60° exits with a diffraction angle of 0°, red light being caused to enter the hologram lens at an angle of incidence of 65°, and blue light being incident at an angle of 55°, so that the diffraction angle is approximately −5°. Therefore, if focal length of the hologram lens 19e is determined from the pitch between the pixel electrodes and the diffraction angle, it is possible to condense the lights of each color at corresponding pixel electrodes.

The three primary colors of light reaching the pixel electrode layer 15 are each reflected by the corresponding pixel electrodes, and pass through the liquid-crystal layer 16, at which point they are modulated by a signal. A P polarized component containing picture information passes through the hologram lens array 19 without being diffracted, and then passes through the coupling prism 11 and the projection lens, so as to be display as a color image on a screen (not shown in the drawing). The polarization characteristics of the hologram lens array are described in detail in the Japanese Patent Application Laid-open Publication H9-189809 of the inventors.

Configuration and Operation of the Color-separation Section 1

Figure 7:
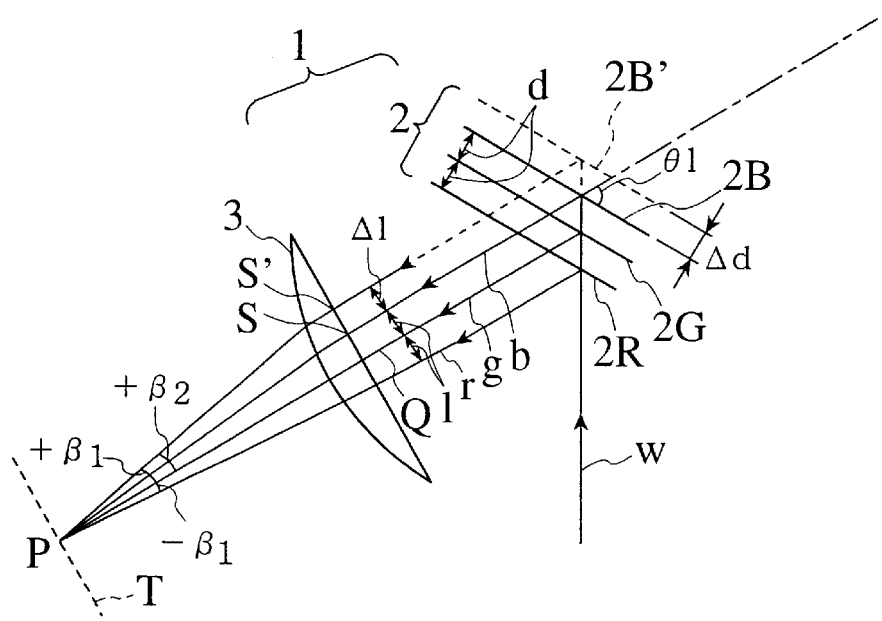
FIG. 7 is a drawing illustrating the configuration of a color-separation section of according to the first embodiment of the present invention.

The color-separation section 1 provided in the projection display apparatus 100 is described in detail below. FIG. 7 illustrates the configuration of the color-separation section 1. In this drawing, the color-separation section 1 is shown as being generally formed by a color-separation element 2 and a condenser lens 3. In this drawing, the point P is the focal point at the center of the light flux of the light of each wavelength band, and T is the virtual image illumination object formed in space by the collection of points P.

The color-separation element 2 comprises an R dichroic mirror 2R that selectively reflects only red light r, and passes light rays of a different wavelength band, a G dichroic mirror 2G that selectively reflects only green light g, and passes light rays of a different wavelength band, and a B dichroic mirror 2B that selectively reflects only blue light b, and passes light rays of a different wavelength band, these being mutually parallel and arranged at a prescribed spacing d.

These dichroic mirrors 2R, 2G, and 2B are positioned so as to be inclined by a prescribed angle θ1 with respect to the light axis Q of the condenser lens 3. In this embodiment, the angle θ1 is established as 45°.

A white light w incident to the color-separation section 1 is separated into three colors by the action of the R, G, and B dichroic mirrors 2R, 2G, and 2B, which form the color-separation element 2 of the color-separation section 1. More specifically, of the white light w that is incident to the color-separation section 1, light of the red wavelength band (red light r) is selectively reflected by the R dichroic mirror 2R, and caused to enter the next-stage condenser lens 3 substantially perpendicularly. When this occurs, light of a wavelength other than the red light r (cyan light) passes through the R dichroic mirror and reaches the G dichroic mirror 2G at the back.

Of the cyan light that reaches the G dichroic mirror 2G, light of the green wavelength band is selectively reflected by the G dichroic mirror 2G, and enters the next-stage condenser lens 3 substantially perpendicularly. When this occurs, light of a wavelength other than the green light g passes through, and reaches the B dichroic mirror 2B at the back.

Light of a wavelength band that passed through both the R dichroic mirror 2R and the G dichroic mirror 2G (that is, blue light b) is reflected by the B dichroic mirror 2B and enters the next-stage condenser lens 3 substantially perpendicularly.

In a color-separation element 2 such as described above, white light w from the light source 4 is separated into light rays of various wavelength bands, the red light rays r, the green light rays g, and the blue light rays b of each of these wavelength bands being shift in parallel by a distance responsive to the spacing d between the dichroic mirrors 2R, 2G, and 2B, at which shifted positions they strike the condenser lens 3. That is, in this embodiment the light flux center of green light g is caused to correspond to the optical axis Q, the center of the light flux of red light r being shifted to below the optical axis Q, and the center of the light flux of blue light b being shifted to above the optical axis Q.

Therefore, when the red light r, green light g, and blue light b pass through the condenser lens 3, they are refracted at an angle that corresponds to each shift amount. That is, whereas the light flux center of the green light g approach directly along the optical axis Q of the condenser lens 3, the principal ray of red light r is incident at an angle of $-\beta 1$ to point P of the virtual image to be illuminated, and the principal ray of blue light b is incident at an angle of $+\beta 1$ to point P of the virtual image to be illuminated. In expressing these angles of incidence, as a convenience angles above the optical axis Q are taken as positive, and angle below the optical axis Q are taken as negative.

The angle of incidence of each light ray is changed by using the above-noted color-separation element, according to the following procedure. The example given is the case of changing the angle of incidence of blue light b, and the angle of incidence of light of the other colors can be changed in the same manner.

First, the B dichroic mirror 2B is shifted to the rear by an amount $\Delta d$ to the position 2B'. By doing this, the main optical axis of blue light b reflected by the B dichroic mirror 2B is shifted in parallel upward by an amount $\Delta l$, so that the point of incidence of this light on the condenser lens 3 is shifted from S to S'. As a result, the angle of incidence of the blue light b exiting from the condenser lens 3 with respect to the virtual image illuminated object T is changed from $+\beta 1$ to $+\beta 2$. When this occurs, the point of incidence at the virtual illuminated image T is the same point P, this remaining unchanged, even though the angle of incidence is changed.

Thus, according to the color-separation section 1, by merely changing the spacing of the three dichroic mirrors 2R, 2G, and 2B corresponding to the primary colors, it is possible to arbitrarily change the angle of exit of the primary colors from the color-separation section, and to have the point of incidence P on the illuminate object remain constant, even if the angle of incidence is changed.

Second Embodiment

Figure 8:
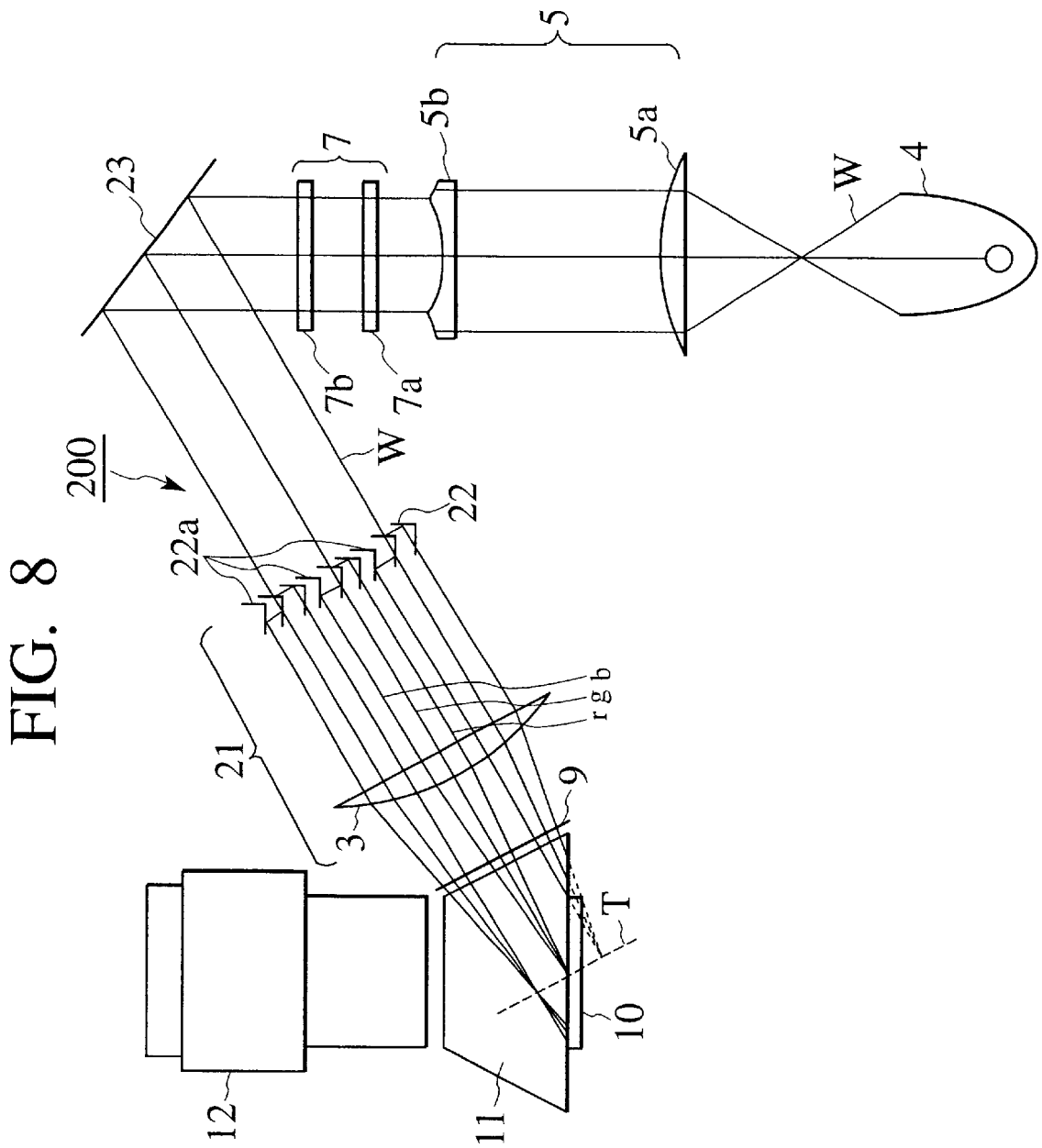
FIG. 8 is a drawing of the general configuration of a projection display apparatus according to the second embodiment of the present invention.

The second embodiment of the present invention is described below in detail. FIG. 8 illustrates a projection display apparatus 200 according to this embodiment.

Configuration of the Projection Display Apparatus 200

As shown in FIG. 8, the projection display apparatus 200 generally has light source 4 radiating a white light w, a collimator lens 5 that converts the condensed light flux from the light source 4 to collimated light flux, an integrator 7 for making the intensity distribution of the illumination light at the object being illuminated uniform, a reflective mirror 23 that reflects light flux from the integrator 7 at a prescribed angle, a color-separation section 21 for dividing the light flux into chromatic light in each wavelength band, a polarizer 9 for polarizing each of the separated light beams of various wavelength bands, a spatial light modulation section 10, a coupling prism 11, and a projection lens 12. In this embodiment, elements having the same functions as elements in the first embodiment have been assigned the same reference numerals and are omitted from this description.

Configuration and Operation of the Color-separation Element 21

Figure 9:
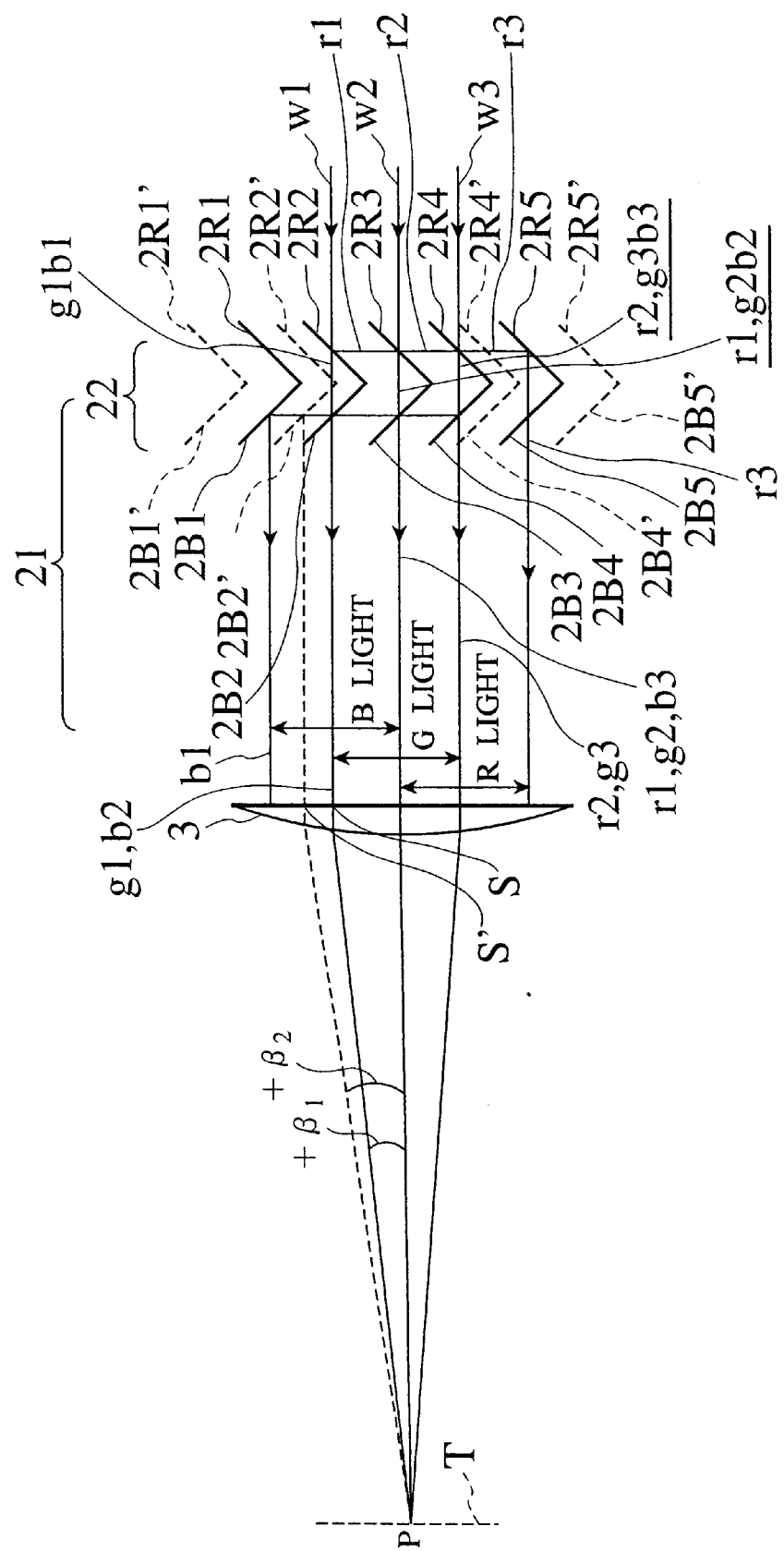
FIG. 9 is a drawing showing the configuration of a color-separation section according to the second embodiment of the present invention.

The projection display apparatus 200 of this embodiment has a color-separation element 21, which is formed by a color-separation element 22, and a condenser lens 3. FIG. 9 is a partial enlarged view of the color-separation section 21.

The color-separation element 22 is formed by a plurality of V-shaped dichroic mirrors 22a, each formed by two dichroic mirrors joined in a V-shape with a prescribed angle therebetween, spaced at a prescribed interval.

The V-shaped dichroic mirror 22a, as shown in this drawing, has R dichroic mirrors 2R1 to 2R5 which selectively reflect red light r only and pass light rays of wavelength bands of other colors, and B dichroic mirrors 2B1 to 2B5, which selectively reflect blue light only, and pass light of wavelength bands of other colors, these being joined at a prescribed angle. This plurality of V-shaped dichroic mirrors 22a is disposed in this embodiment at a prescribed interval of k1, this prescribed interval k1 being changed by a driving means (not shown in the drawing).

The operation of color-separation section 21 configured as described above is as follows. When white lights w1 to w3 enter the color-separation section 21, it is separated into red light r1 and cyan light g1b1. The red light r1 is reflected by the R dichroic mirror 2R2, and enters the R dichroic mirror 2R3 therebelow, at which it is again reflected, horizontally to the left, so that it enters the opposing B dichroic mirror 2B3. Because the B dichroic mirror 2B3 selectively reflects only the blue light b, the incident red light r1 is passed, so that it enters the next-stage condenser lens 3 substantially perpendicularly.

The cyan light g1b1 that passed through the R dichroic mirror 2R2 enters the opposing B dichroic mirror 2B2, at which the green light g1 passes through the B dichroic mirror 2B2, and the blue light b1 is reflected, so as to separate it. The transmitted green light g1 then enters the next-stage condenser lens 3 as is, substantially perpendicularly thereto. The blue light b1 enters the B dichroic mirror 2B1 above, at which it is again reflected horizontally to the left, so that it enters the next-stage condenser lens 3 substantially perpendicularly. Thereafter, in the same manner, the read light r2 reflected by the R dichroic mirror 2R3 is again reflected by the R dichroic mirror 2R4, and passes through the B dichroic mirror 2B4, so that it enters the next-stage condenser lens 3 perpendicularly. Additionally, the red light r3 reflected from the R dichroic mirror 2R2 is again reflected by the dichroic mirror 2R5 and passed through the dichroic mirror 2B5, so that it enters the next-stage condenser lens 3.

Cyan light g2b2 passed through the R dichroic mirror 2R3 is divided by the B dichroic mirror 2B3 into the green light g2 and the blue light b2, the blue light b2 being reflected at the B dichroic mirrors 2B3 and 2B2, and caused to enter the next-stage condenser lens 3 substantially perpendicularly. The green light g2 passes through the B dichroic mirror 2B3, and enters the next-stage condenser lens 3 as is, substantially perpendicularly.

The cyan light g3b3 passed through the R dichroic mirror 2R4 is divided by the B dichroic mirror 2B4 into the green light g3 and the blue light b3, the blue light b3 being reflected by the B dichroic mirrors 2B4 and 2B3 and entering the next-stage condenser lens 3 substantially perpendicularly. The green light g3 passes through the B dichroic mirror 2B4 and enters the next-stage condenser lens 3 as is, substantially perpendicularly.

In this manner, the white light w is separated into the three primary colors. The red light r and the blue light b are shifted up and down by a prescribed amount with regard to the green light g as the center before they enter the condenser lens 3. For this reason, each of the colors exiting from the condenser lens 3 has a different exit angle.

The operation of changing the angle of incidence with respect to the illuminated object T is as follows. Specifically, the spacing k1 between the V-shaped dichroic mirrors is changed by a driving mechanism (not shown in the drawing) to K2. By doing this, the positions of each of the dichroic mirrors, is changed to 2R1', 2R2', 2R4', 2R5', 2B1', 2B2', 2B4', and 2B5'. Therefore, the main axis of the blue light b passed through the R dichroic mirror 2R3 is reflected upward by the oppositely positioned B dichroic mirror 2B3, and is reflected horizontally to the left by the B dichroic mirror 2B2' position above, so that it enters the next-stage condenser lens 3 substantially perpendicularly. When this occurs, the center position of the light flux of the blue light b is shifted from S to S'. Therefore, the angle of incidence of the blue light b exiting from the condenser lens 3 with respect to the illuminated object is changed from $+\beta 1$ to $+\beta 2$, but the position of incidence P at the illumination object T is not changed.

According to a color-separation section 21 as described above, because of the small size of the dichroic mirrors forming the group of color-separation elements, it is possible to achieve not only a compact apparatus, but also to reduce the cost thereof. By merely changing the spacing between the V-shaped dichroic mirrors, it is possible to arbitrarily change the exit angle of the three primary color lights from the color-separation section. Because the point of incidence at the illumination does not change even if the angle of incidence changes, adjustment of the angle of incidence is facilitated, the adjustment mechanism is simplified, and the manufacturing cost is reduced.

Third Embodiment

Figure 10A:
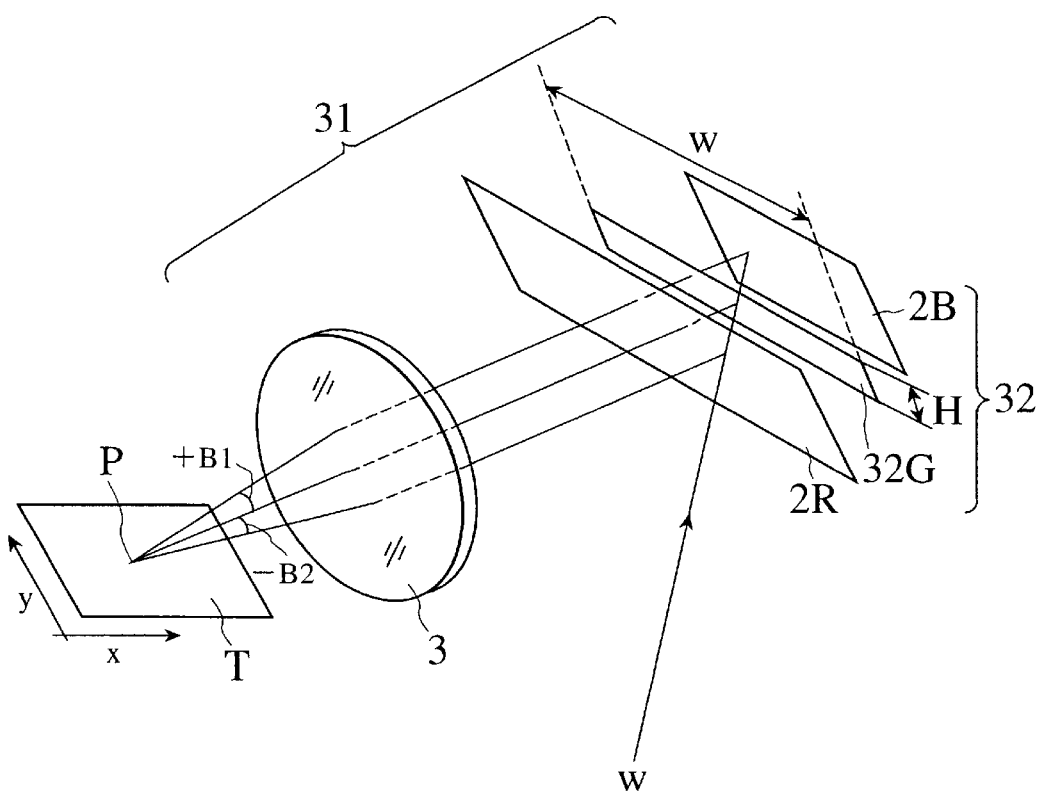
FIG. 10A, FIG. 10B, and 10C are drawings illustrating the configurations of the color-separation section according to the third embodiment of the present invention.
Figure 10B:
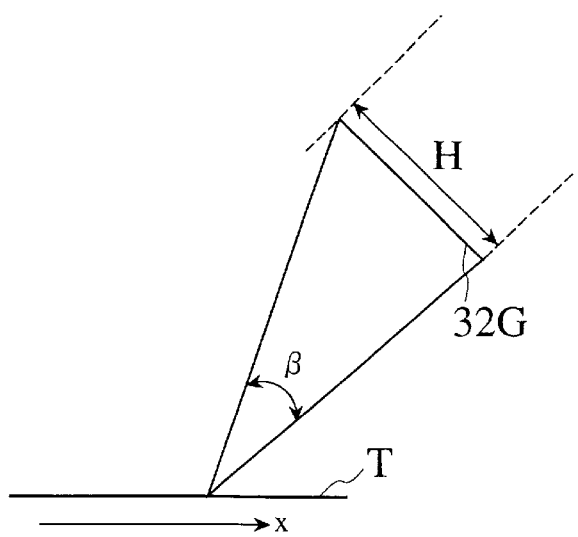
Figure 10C:
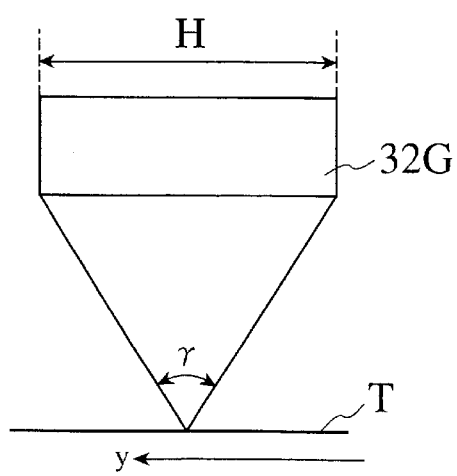

The third embodiment of the present invention is described below in detail. FIG. 10A, 10B, and 10C illustrate a color-separation section 31 provided in a projection display apparatus according to this embodiment. Of these drawings, FIG. 10A is a schematic representation of the configuration of the color-separation section 31, FIG. 10B is a side view of T seen from the y direction in FIG. 10A, and FIG. 10C is a front view of T seen from the x direction in FIG. 10A.

The overall configuration of the projection display apparatus of this embodiment is substantially the same as that of the projection display apparatus 100 of the first embodiment. In this embodiment, in place of the color-separation element 1 of the projection display apparatus 100, however, this is provided the color-separation section 31.

Configuration and Operation of the Color-separation Element 31

As shown in FIG. 10A, the color-separation section 31 has three color-separation elements 32, these being three dichroic mirrors, of which the dimensions of the dichroic mirror disposed in the middle and which reflects the light of a wavelength that has the greatest intensity, which in this embodiment is the G dichroic mirror 32G, are different than the G dichroic mirror 2G described above.

More specifically, the height H and the width W of the G dichroic mirror 32G are made smaller than the above-noted G dichroic mirror 2G. By doing this, the cyan light peripheral part that missed the dichroic mirror 32G is not reflected by the G dichroic mirror 32G and enter the B dichroic mirror 32B therebehind. Because the B dichroic mirror 32B, as described above, selectively reflects only blue light b, green light g that is not reflected by the G dichroic mirror 32G and reaches the B dichroic mirror 32B is not reflected by the B dichroic mirror 32B as well, resulting in this light being radiated outside the circle so as to be eliminated.

As a result, only the green light g enters the next-stage condenser lens 3 with a reduced intensity. The result of this is that there is a reduction in the illumination of the green light g, which has the greatest intensity and to which the eye has the greatest sensitivity, thereby establishing an intensity balance with respect to other colors, and facilitating the adjustment of color balance in the projection display apparatus.

It is possible, as shown in FIG. 10B, to adjust the height H of the G dichroic mirror 32G so as to make the angle of incidence range $\beta$ smaller, and improve the color purity or, as shown in FIG. 10C, to adjust the width W so as to make the angle of incidence range $\gamma$ smaller, thereby improving the image contrast.

Fourth Embodiment

The fourth embodiment of the present invention is described below. This embodiment avoids the problem of defocusing that occurs at the spatial light modulation section 10 in the first through the third embodiments. The mechanism for the occurrence of this defocusing will be described using the projection display apparatus 100 of the first embodiment.

Defocusing Mechanism in the Projection Display Apparatus 100

Figure 11:
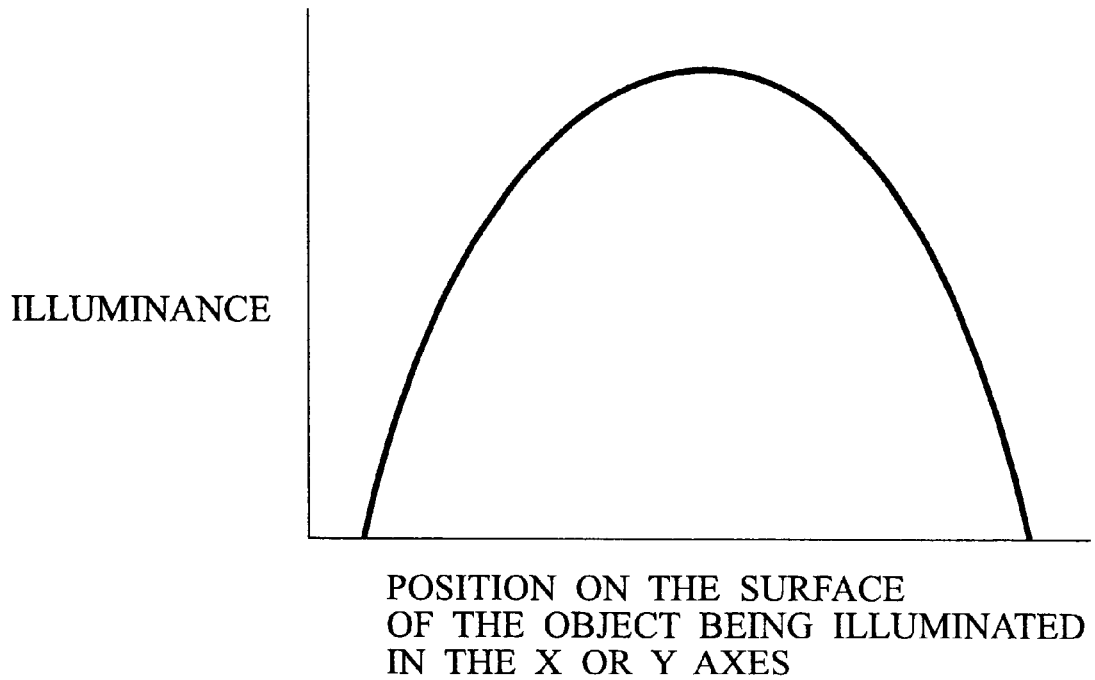
FIG. 11 is a graph showing the intensity distribution at the surface being illuminated in the first embodiment of the present invention.

As shown in FIG. 5, the various colors of light separated by the color-separation element 2 strike the spatial light modulation section 10, which is to be illuminated, at an inclination. FIG. 11 a conceptual diagram showing distribution when the spatial light modulation section 10 is illuminated at an inclination. In this drawing.

In the projection display apparatus 100 of the first embodiment, within the coupling prism 11, because the configuration is such that a virtual image T is formed perpendicular to the light axis, at the surface of a spatial light modulation section 10 that is disposed at an inclination to the light axis, as the distance from the light axis increases, the distance of the focal point from the virtual illuminated image T increases, thereby resulting in image defocusing at a position removed from the optical axis. Therefore, the intensity distribution on the surface of the spatial light modulation section 10, as shown in FIG. 11, is non-uniform, being lighter at the center part and darker at the peripheral part.

Because of this, the projection display apparatus 400 has as an object the prevention of defocusing on the spatial light modulation section 10. The configuration of the projection display apparatus 400 is described below.

Configuration the Projection Display Apparatus 400

Figure 12:
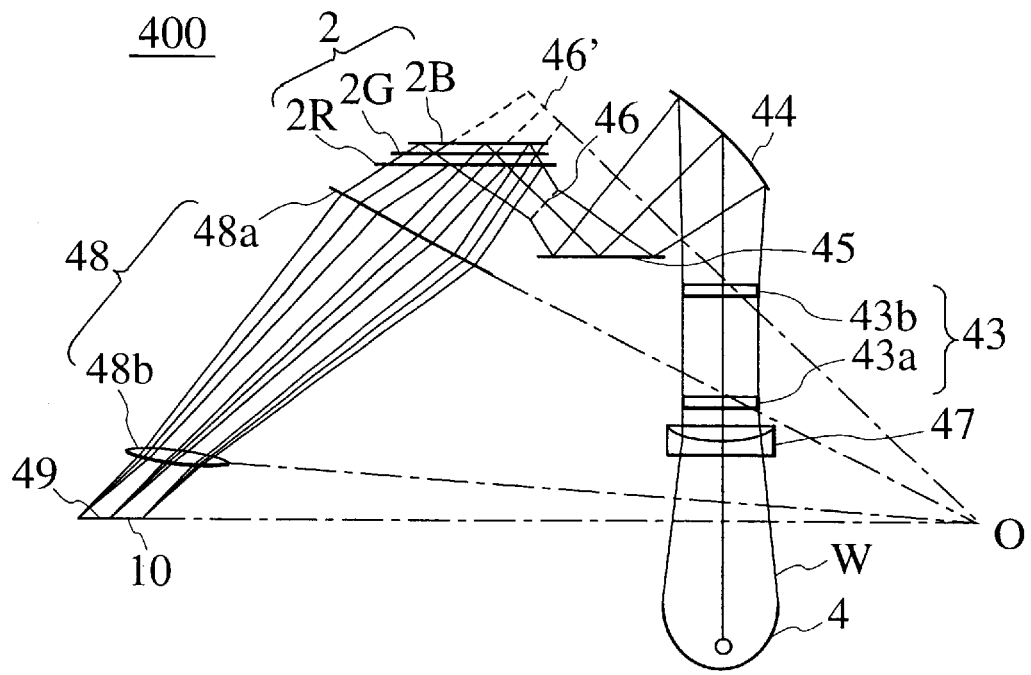
FIG. 12 is a drawing showing the general configuration of a projection display apparatus according to the fourth embodiment of the present invention.

As shown in FIG. 12, the projection display apparatus 400 is formed by a first image optical system, a second image optical system, and a color-separation element 2 provided between the first and second image optical systems.

The first image optical system is formed by a light source 4 radiating a white light, a collimator lens 47 that converts the condensed light flux from the light source 4 to substantially collimated light flux, an integrator 43 for making the intensity distribution of the illumination light at the object being illuminated uniform, a concave lens for overlapping an image output from the integrator 43 on a first image-forming plane 46, and a concave lens 44.

The integrator 43 is formed by a first integrator 43a arranged as an array of a plurality of small-diameter lens segments, and a second integrator 43b having a plurality of lens segments for the purpose of forming the image output by each of the lens segments of the first integrator 43a on a first image-forming plane 46. Each of the lens segments of the first and second integrators 43a and 43b correspond to one another.

The concave lens 44 refracts the light path by a prescribed angle, and also serves as a field lens for overlapping the plurality of light flux output from each segment of the second integrator 43b onto the first image plane.

The second image optical system is formed by an image lens group 48 that forms an image on the second image plane 49.

The image lens group 48 is formed by a relay lens 48a that forms the image at the first image plane 46 onto the spatial light modulation section 10, and a field lens 48b that converts the light flux output from the relay lens 48 to collimated light flux. The relay lens 48a and the field lens 48b form a telecentric image optical system. That is, virtual image plane 46' with respect to the color-separation element 2 of the first image plane 46, the outer peripheral surfaces of the relay lens 48a and field lens 48b, and the extension of the surface of the spatial light modulation section 10 disposed at an inclination to the optical axis are disposed so as to intersect on a single straight line O (line perpendicular to the drawing plane in FIG. 12).

In the second image optical system, in order to correctly form the image of the first image plane 46 on the surface of the spatial light modulation section 10, which is at an inclination with respect to the illumination optical axis, the virtual image plane 46' with respect to the color-separation element 2 of the first image plane 46, the principal plane of the relay lens 48a and the field lens 48b that form the image lens group 48, and the extension of the surface of the spatial light modulation section 10 are disposed so as to intersect on a single straight line O.

In this embodiment, an infrared and ultraviolet cutting filter for eliminating unwanted light, and a polarizer and coupling prism inserted before the field lens 48b for the purpose of supplying linearly polarized light to the spatial light modulation section 10 are not shown in the drawing.

Operation of the Projection Display Apparatus 400

The operation of the above-noted projection display apparatus 400 is as follows.

White light from the light source 4 is converted to collimated light flux by the collimator lens 47 and enters the first integrator 43a of the integrator 43. Light rays that pass through each lens segment of the first integrator 43a are condensed at corresponding lens segments of the second integrator 43b, which forms an image from the lens segments of the first integrator 43a on the first image plane 46.

Light rays exiting from the second integrator 43b enter the concave lens 44. The concave lens 44 bends these light rays and causing mutual overlapping of an image of the first integrator 43a onto the first image plane 46.

The light paths of light rays exiting from the concave lens 44 are reflected by the reflective mirror 45, after which they are condensed together at the first image plane 46, and then enter the color-separation element 2. At the color-separation element 2, first red light r is selectively reflected by the R dichroic mirror 2R, with light of another color (cyan) other than red light r being caused to enter the G dichroic mirror 2G that is positioned in the rear.

Of the cyan light, green light g is selectively reflected by the D dichroic mirror 2G, and passed through the R dichroic mirror 2R, so as to exit from the color-separation element 2. The blue light b of the cyan light that passed through the G dichroic mirror 2G is selectively reflected by the B dichroic mirror 2B, passes through the G dichroic mirror 2G and the R dichroic mirror 2R, and exits from the color-separation means 2.

In this manner, the white light is separated into the three primary colors, red, green, and blue. When this is done, because the dichroic mirrors 2R, 2G, and 2B of the color-separation element 2 are disposed in parallel with a prescribed interval between them, and at prescribed angles from the vertical axis of the illumination optical axis, the three primary color lights that exit from the color-separation element 2 are shifted in parallel with respect to the green light g as the center. Therefore, when light is incident to the spatial light modulation section 10 after passing through the image lenses 48, these light colors are incident with mutually differing angles of incidence.

Each of the light rays separated into three primary colors pass through the image lenses 48 and are directed toward the spatial light modulation section 10 and then exit. Because the virtual image plane 46', the relay lens 48a and field lens 48b that form the imaging lenses 48, and the surface of the spatial light modulation section 10 form a telecentric image optical system, it is possible to correctly form an image on the spatial light modulation section 10.

Figure 13:
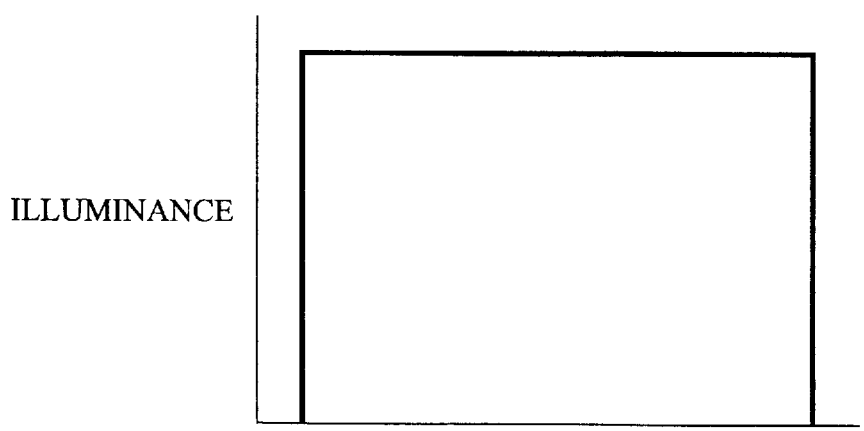
FIG. 13 is a graph showing the intensity distribution at the surface being illuminated in the fourth embodiment of the present invention.

Therefore, as shown by the illumination distribution in the X and Y directions of the spatial light modulation section 10 of FIG. 13, the distribution of illuminance is uniform, and it is possible to display a projected image that has a uniform illuminance. Furthermore, because the three primary colors that illuminate the spatial light modulation section 10 are collimated light fluxes, even with respect to a spatial light modulation section 10 that is disposed at an inclination with respect to the optical axis, it is possible to form an image on the first image plane 46 without distortion. For example, with a rectangular segment lens in the first integrator 43a, it is possible to have the resulting rectangular image substantially coincide with the rectangle of the spatial light modulation section 10, thereby improving the efficiency of light usage, and providing a bright projected display.

It is possible to use a Fresnel lens as the relay lens 48a, in which case, in order to reduce the loss of light caused by the protrusions and depressions in the lens surface, the periphery of the Fresnel lens can be made perpendicular to the optical axis. It is additionally possible to make the inclination of the field lens 48b variable, so as to enable adjustment of the image condition at the spatial light modulation section 10.

Modification of Fourth Embodiment

Figure 14:
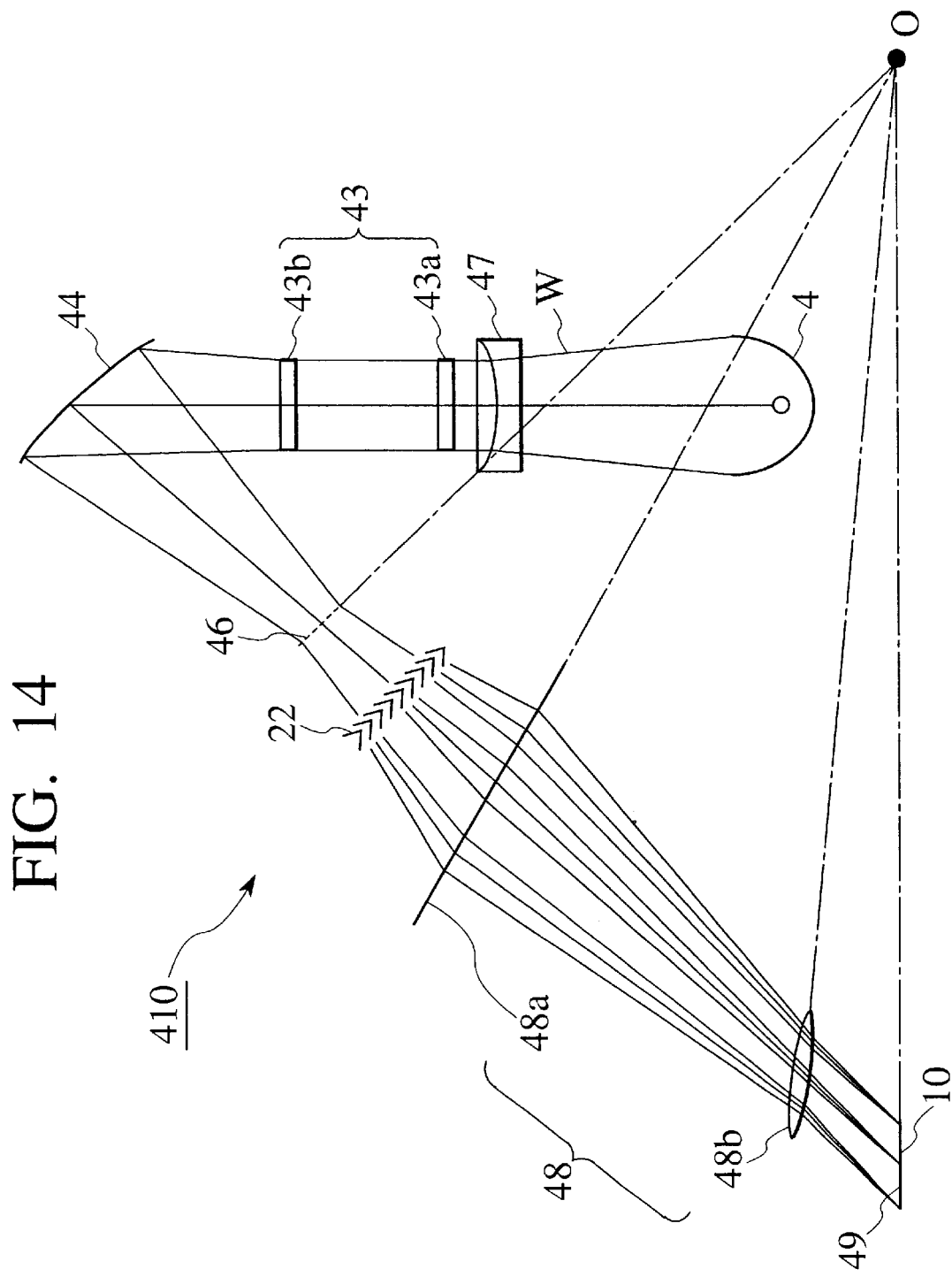
FIG. 14 is a drawing showing the general configuration of a variation of a projection display apparatus according to the fourth embodiment of the present invention.

Although the above-noted projection display apparatus 400 is provided with the color-separation element 2 of the first embodiment, the present invention is not restricted in this manner. For example, in place of the color-separation element 2, it is possible to use a color-separation element 22 according to the second embodiment. FIG. 14 shows the general configuration of a projection display apparatus 410 that uses the color-separation element 22.

As shown in FIG. 14, the projection display apparatus 410 has a first image optical system, a second image optical system, and a color-separation element provided between the first image optical system and the second image optical system.

The first imaging optical system is formed by a light source 4 radiating a white light, a collimator lens 47 that converts the condensed light flux from the light source 4 to substantially collimated light flux, an integrator 43 for making the intensity distribution of the illumination light at the object being illuminated uniform, a concave lens for overlapping an image output from the integrator 43 on a first image plane 46, and a concave lens 44.

The second imaging optical system is formed by an image lens group 48 that forms an image on the second image plane 49. In the second image optical system, in order to correctly form an image on the surface of the spatial light modulation section 10 inclined with respect to the optical axis, first image plane 46, the outer peripheral surfaces of the relay lens 48a and field lens 48b of the image lenses 48, and the extension of the surface of the spatial light modulation section 10 are disposed so as to intersect on a single straight line O (line perpendicular to the drawing plane in FIG. 14).

The color-separation element 22, as described above with regard to the second embodiment, is formed by a plurality of V-shaped dichroic mirrors 22a, each formed by two dichroic mirrors joined in a V-shape with a prescribed angle therebetween, spaced at a prescribed interval. In this embodiment as well, this plurality of V-shaped dichroic mirrors 22a are spaced at a prescribed interval, which can be changed by a driving means (not shown in the drawing).

According to the color-separation element 22 described above, white light w is separated into three primary colors, and red and blue light are shifted up and down with respect to green light as the center before entering the relay lens 48a. For this reason, the various colors of light from the relay lens 48a exit therefrom with different exiting angles.

According to the projection display apparatus 410, the first image-forming plane 46, the relay lens 48a and field lens 48b of the image lens group 48, and the upper surface of the spatial light modulation section 10 (second image surface 49) form a telecentric image optical system, thereby enabling the correct formation of an image on the spatial light modulation section 10.

Therefore, the illuminance distribution in the X-axis and Y-axis directions on the surface of the spatial light modulation section 10 is uniform over the entire surface, enabling projection of an image with uniform illumination. Furthermore, because the three primary color lights that illuminate the spatial light modulation section 10 are collimated light flux, even if the spatial light modulation section 10 is inclined with respect to the optical axis, it is possible to form an image without distortion.

In this variation of the present invention as well, it is possible to use a Fresnel lens as the relay lens 48a, in which case, in order to reduce the loss of light caused by the protrusions and depressions in the lens surface, the periphery of the Fresnel lens can be made perpendicular to the optical axis. By making the inclination angle of the Fresnel lens 48b variable, it is possible to adjust the image condition at the spatial light modulation section 10.

In the present invention, it is possible to use a microlens array as the hologram filter, and to alternately use, instead of a reflective type, a transmission-type spatial light modulation section 10.

According to the present invention, it is possible with a simple adjustment mechanism to adjust the exit angles of the separated three primary colors, and further it is possible to adjust the color balance and contrast and the like and prevent defocusing, so as to obtain a projected image with improved quality.

What is claimed is:

1. An image projection display apparatus in which light of a plurality of wavelength bands is separated into lights of different wavelength bands, these lights of different wavelength band being modulated so as to display a projected image, comprising:
   a color-separation element having a plurality of wavelength-selective reflective mirrors selectively reflecting chromatic light of a prescribed wavelength band and passing chromatic light of another wavelength band, arranged in parallel at a prescribed interval, and at a prescribed angle with respect to an optical axis; and
   a condensing element for condensing each of the colors of light separated by the color-separation element;
   wherein an interval between the wavelength-selective reflective mirrors is adjusted so as to change the angle of incidence of the separated colors of light with respect to the condensing element, so as to change the angle of exit of each color of light from the condensing element.

2. A projection display apparatus according to claim 1, wherein of the wavelength-selective reflective mirrors, one mirror has a dimension that is smaller than the other wavelength-selective reflective mirrors.

3. An image projection display apparatus in which white light containing light of three primary colors is separated into each color and modulated so as to display a projected image, comprising:
   a color-separation element having at least three V-shaped mirrors, a first V-shaped mirror, a second V-shaped mirror, and a third V-shaped mirror, comprising a first wavelength-selective reflective mirror selectively reflecting a first color light of the white light and passing a second and a third color light, and a second wavelength-selective reflective mirror provided behind the first wavelength-selective reflective mirror selectively reflecting the third color light and passing the first and second color lights, arranged in a lamination direction and at a prescribed interval; and
   a condensing element for condensing light of the first, the second, and the third color separated by the color-separation element, wherein
   the white light is caused to enter the first wavelength-selective reflective mirror of the second V-shaped mirror, the first color being reflected and the second and third colors being passed, the first color being reflected by the first wavelength-selective reflective mirror of the first V-shaped mirror, after which it is passed through the second wavelength-selective reflective mirror of the first V-shaped mirror, and caused to exit from the first V-shaped mirror,
   of the second and third color light passed through the first wavelength-selective reflective mirror of the second V-shaped mirror, the third color light is caused to be reflected by the second wavelength-selective reflective mirror of the second V-shaped mirror, the second color light being passed and caused to exit from the second V-shaped mirror, and
   the third color light reflected by the second wavelength-selective reflective mirror of the second V-shaped mirror is caused to be reflected by the second wavelength-selective reflective mirror of the third V-shaped mirror and caused to exit from the third V-shaped mirror.

4. A projection display apparatus according to claim 3, wherein the color-separation element emits the first color light, the second color light and the third color light separated from the white light to the condensing element with being shifted in parallel by a distance responsive to the spacing between the first V-shaped mirror, the second V-shaped mirror and the third V-shaped mirror, and the condensing element emits the first color light, the second color light and the third color light at an angle responsive to the shifted distance from an optical axis.

5. A projection display apparatus in which a modulation section is illuminated by light from a light source and modulated by the modulation section so as to display a projected image, comprising:

an integrator having a large number of small-diameter lenses for converting light flux from the light source to a large number of light fluxes;

a first image optical system for overlapping the large number of light fluxes at a first image plane; and a second image optical system for forming an image formed at the first image plane on a second image plane;

wherein a virtual image with respect to a color-separation element of the first image plane, a principal plane of the second image optical system, and the modulation section are disposed so that the respective extension lines on the first image plane, the principal plane and the modulation section intersect on a single straight line, thereby to form an image of the first image plane on the modulation section disposed at an inclination to an optical axis.

* * * * *